(12) United States Patent
Gong et al.

(10) Patent No.: US 9,320,054 B2
(45) Date of Patent: Apr. 19, 2016

(54) DEVICE, SYSTEM AND METHOD OF SCHEDULING COMMUNICATIONS WITH A GROUP OF WIRELESS COMMUNICATION UNITS

(71) Applicant: INTEL CORPORATION, Santa Clara, CA (US)

(72) Inventors: Michelle X. Gong, Sunnyvale, CA (US); Robert J. Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/508,209

(22) Filed: Oct. 7, 2014

(65) Prior Publication Data

US 2015/0023171 A1    Jan. 22, 2015

Related U.S. Application Data

(63) Continuation of application No. 13/755,395, filed on Jan. 31, 2013, now Pat. No. 8,897,185, which is a continuation of application No. 12/640,027, filed on Dec. 17, 2009, now abandoned.

(51) Int. Cl.
*H04B 7/00* (2006.01)
*H04W 72/12* (2009.01)
(Continued)

(52) U.S. Cl.
CPC ............ *H04W 72/1273* (2013.01); *H04W 4/08* (2013.01); *H04W 28/10* (2013.01); *H04W 52/02* (2013.01); *H04W 72/12* (2013.01); *H04W 72/121* (2013.01); *H04W 4/06* (2013.01)

(58) Field of Classification Search
CPC .. H04W 76/002; H04W 76/02; H04W 76/025
USPC .......... 370/310, 328, 329, 330, 431, 449, 464
See application file for complete search history.

(56) References Cited

U.S. PATENT DOCUMENTS 6,891,810 B2   5/2005   Struhsaker et al.
7,701,888 B2   4/2010   Jang et al.
(Continued)

FOREIGN PATENT DOCUMENTS

CN       1826762     8/2006
CN     101083516    12/2007
(Continued)

OTHER PUBLICATIONS

Office Action for Chinese Patent Application No. 201010597726.X, mailed on Dec. 3, 2014, 7 pages, including 4 pages of English translation.

(Continued)

*Primary Examiner* — Dmitry H Levitan
(74) *Attorney, Agent, or Firm* — Shichrur & Co.

(57) ABSTRACT

Some demonstrative embodiments include devices, systems and/or methods of scheduling communications with a group of wireless communication devices. For example, a wireless communication unit may transmit at least one scheduling frame including an indication of a downlink period allocated for simultaneous transmission from the wireless communication unit to at least one group of a plurality of wireless communication devices, wherein the wireless communication unit is to simultaneously transmit a plurality of different wireless communication transmissions to the plurality of wireless communication devices of the group during the downlink period. Other embodiments are described and claimed.

24 Claims, 5 Drawing Sheets

(51) Int. Cl.
*H04W 4/08* (2009.01)
*H04W 52/02* (2009.01)
*H04W 28/10* (2009.01)
*H04W 4/06* (2009.01)

(56) References Cited

U.S. PATENT DOCUMENTS

| | | | |
|---|---|---|---|
| 7,751,396 B2 | 7/2010 | Kakani | |
| 7,804,762 B2 * | 9/2010 | Stephens et al. | 370/208 |
| 7,804,842 B2 | 9/2010 | Malik et al. | |
| 7,873,018 B2 | 1/2011 | Kakani | |
| 7,889,701 B2 | 2/2011 | Malik et al. | |
| 7,983,203 B2 | 7/2011 | Kakani et al. | |
| 8,194,604 B2 * | 6/2012 | Gault et al. | 370/330 |
| 8,310,995 B2 | 11/2012 | Murai et al. | |
| 8,467,345 B2 | 6/2013 | Abraham et al. | |
| 8,483,128 B2 * | 7/2013 | Lin et al. | 370/328 |
| 8,498,275 B2 * | 7/2013 | Wentink | 370/336 |
| 8,503,357 B2 | 8/2013 | Matsuo et al. | |
| 8,842,614 B2 * | 9/2014 | Liu et al. | 370/329 |
| 8,897,185 B2 | 11/2014 | Gong et al. | |
| 2003/0081547 A1 | 5/2003 | Ho | |
| 2004/0013135 A1 | 1/2004 | Haddad | |
| 2005/0047384 A1 | 3/2005 | Wax et al. | |
| 2005/0276237 A1 | 12/2005 | Segal et al. | |
| 2006/0164969 A1 | 7/2006 | Malik et al. | |
| 2006/0268716 A1 | 11/2006 | Wijting et al. | |
| 2007/0140197 A1 | 6/2007 | Sawada | |
| 2007/0149236 A1 | 6/2007 | Naden et al. | |
| 2007/0153754 A1 * | 7/2007 | Shapira et al. | 370/338 |
| 2007/0153815 A1 | 7/2007 | She et al. | |
| 2007/0161364 A1 * | 7/2007 | Surineni et al. | 455/343.4 |
| 2007/0274256 A1 | 11/2007 | Murai et al. | |
| 2009/0073954 A1 | 3/2009 | Maltsev et al. | |
| 2009/0124290 A1 | 5/2009 | Tao et al. | |
| 2009/0207799 A1 * | 8/2009 | Mazzarese | 370/329 |
| 2009/0279427 A1 | 11/2009 | Ji et al. | |
| 2010/0260138 A1 | 10/2010 | Liu et al. | |
| 2011/0128900 A1 | 6/2011 | Seok | |
| 2011/0141892 A1 | 6/2011 | Gong et al. | |
| 2011/0149731 A1 | 6/2011 | Gong et al. | |
| 2013/0250887 A1 | 9/2013 | Gong et al. | |

FOREIGN PATENT DOCUMENTS

| | | |
|---|---|---|
| CN | 101534142 | 9/2009 |
| EP | 1863304 | 5/2007 |
| JP | 2005039728 | 2/2005 |
| JP | 2007318576 | 6/2007 |
| JP | 2009528744 | 8/2009 |
| JP | 2009246480 | 10/2009 |
| KR | 10-2009-0072135 | 7/2009 |
| WO | 2007099435 | 9/2007 |
| WO | 2009060650 A1 | 5/2009 |
| WO | 2011084211 | 7/2011 |

OTHER PUBLICATIONS

Office Action for Japanese Patent Application No. 2014-081245, mailed on Mar. 3, 2015, 6 pages, including 3 pages of English translation.
IEEE STD 602.11n "Part 11: Wireless LAN MAC and PHY Specification", IEEE, Oct. 29, 2009, pp. 1-536.
IEEE Std 802.11™, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Jun. 12, 2007, pp. 1-1232.
Office Action for Chinese Patent Application No. 201010597726.X, mailed on Apr. 1, 2013, 11 pages, including 7 pages of English translation.
Office Action for Chinese Patent Application No. 201010601700.8, mailed on Jan. 16, 2013, 15 pages, including 8 pages of English translation.
International Preliminary Report on Patentability of International Application No. PCT/US2010/054461, mailed Jun. 28, 2012, 6 pages.
International Preliminary Report on Patentability of International Application No. PCT/US2010/054947, mailed Jun. 28, 2012, 6 pages.
International Search Report and Written Opinion Received for PCT Patent Application No. PCT/US2010/054461, Mailed on Jun. 28, 2011, 9 pages.
International Search Report and Written Opinion Received for PCT Patent Application No. PCT/US2010/054947, Mailed on Jul. 28, 2011, 9 pages.
Final Office Action for U.S. Appl. No. 12/639,061, mailed on Oct. 12, 2012, 19 pages.
Office Action for U.S. Appl. No. 12/639,061, mailed on Jun. 18, 2012, 23 pages.
Final Office Action for U.S. Appl. No. 12/640,027, mailed on Sep. 4, 2012, 14 pages.
Office Action for U.S. Appl. No. 12/640,027, mailed on Jun. 8, 2012, 17 pages.
Office Action for Chinese Patent Application No. 201010601700.8, mailed on Jun. 9, 2013, 16 pages, including 9 pages of English translation.
Office Action for Japanese Patent Application No. 2012-544507, mailed on Sep. 10, 2013, 6 pages, including 3 pages of English translation.
Zhong Fan, "Wireless Networking with Directional Antennas for 60 GHz Systems", Wireless Conference 2008. EW 2008 14th European, Jun. 22-25, 2008, 9 pages.
Office Action for Japanese Patent Application No. 2012-544508, mailed on Oct. 1, 2013, 6 pages, including 3 pages of English translation.
English translation of Office Action for Korean Patent Application No. 2012-7018497, mailed on Oct. 4, 2013, 3 pages.
Office Action for Chinese Patent Application No. 201010601700.8, mailed on Oct. 15, 2013, 14 pages, including 8 pages of English translation.
Office Action for Chinese Patent Application No. 201010597726.X, mailed on Dec. 6, 2013, 7 pages, including 4 pages of English translation.
Office Action for Japanese Patent Application No. 2012-544508, mailed on Jan. 28, 2014, 4 pages, including 2 pages of English translation.
English translation of Office Action for Korean Patent Application No. 20137032201, mailed on Mar. 13, 2014, 1 page.
English translation of Office Action for Korean Patent Application No. 20127018497, mailed on Apr. 28, 2014, 1 page.
Office Action for Chinese Patent Application No. 201010601700.8, mailed on Feb. 8, 2014, 9 pages, including 5 pages of English translation.
Office Action for Chinese Patent Application No. 201010597726.X, mailed on May 19, 2014, 13 pages, including 8 pages of English translation.
Office Action for Chinese Patent Application No. 201010601700.8, mailed on Aug. 22, 2014, 9 pages, including 5 pages of English translation.
Office Action for U.S. Appl. No. 13/755,395, mailed on Apr. 14, 2014, 19 pages.
Singh et al., "Enhanced Power Saving in Next Generation Wireless LANs", IEEE, 2006, 5 pages.
Office Action for U.S. Appl. No. 13/892,395, mailed on Nov. 18, 2014, 41 pages.
Office Action for Japanese Patent Application No. 2014-081245, mailed on Dec. 8, 2015, 6 pages. (Including 3 pages of English translation).

* cited by examiner

DEVICE, SYSTEM AND METHOD OF SCHEDULING COMMUNICATIONS WITH A GROUP OF WIRELESS COMMUNICATION UNITS

CROSS-REFERENCE

This application is a Continuation application of U.S. patent application Ser. No. 13/755,395, filed Jan. 31, 2013, which is a Continuation application of U.S. patent application Ser. No. 12/640,027, filed Dec. 17, 2009, the entire disclosures of which are both incorporated herein by reference.

BACKGROUND

Some wireless communication devices and/or systems may implement suitable power saving schemes.

For example, according to a Power Save Multi-Poll (PSMP) scheme a first device, for example, a controller or a coordinator of a network, e.g., an Access Point (AP) of a Basic Service Set (BSS), may transmit to a second device, e.g., a station, a PSMP action frame scheduling one or more downlink time periods, during which the station is to be ready to receive transmissions from the AP, and/or one or more uplink time periods, during which the station may be allowed to transmit transmissions to the AP.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
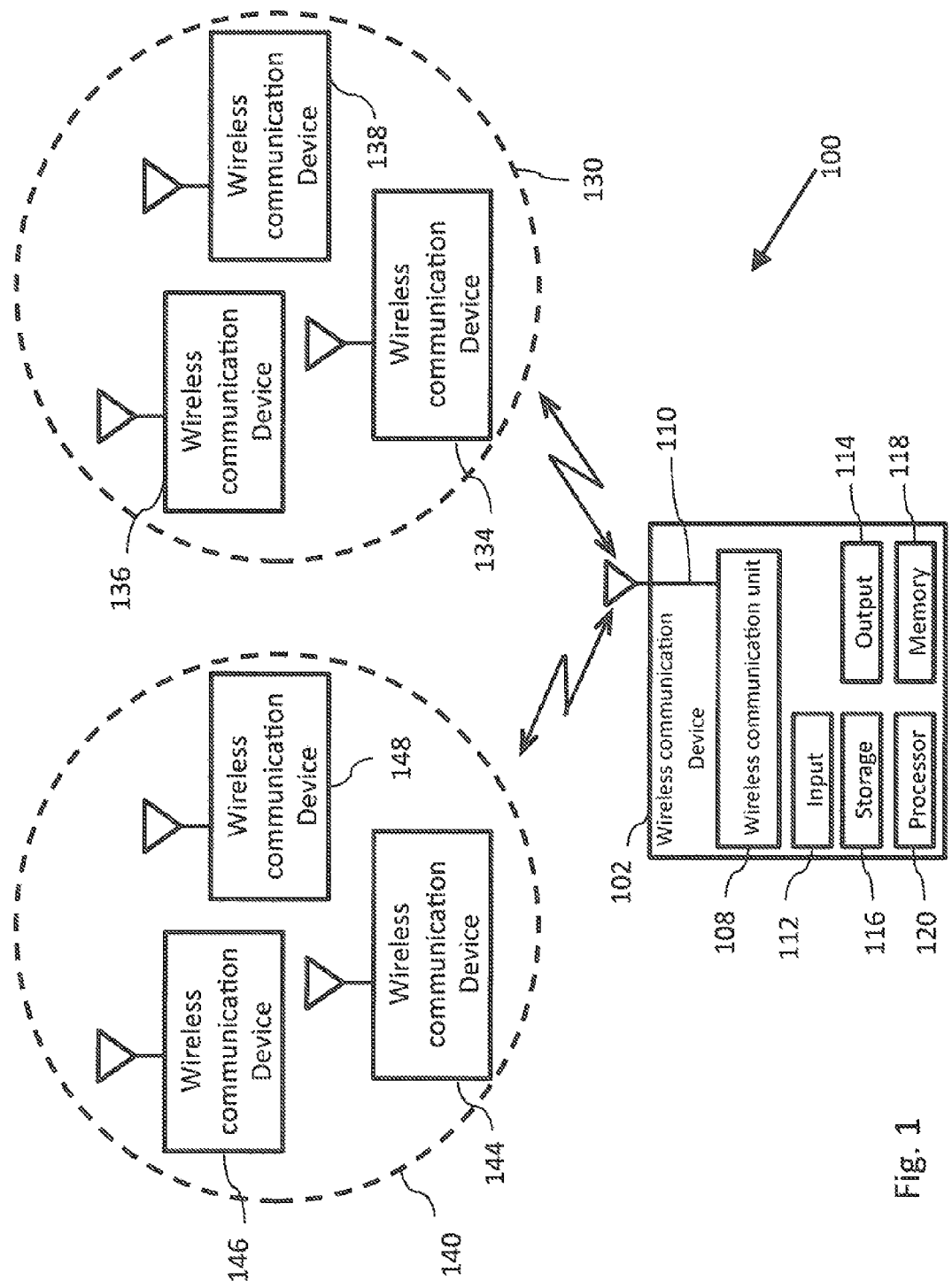
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "power save" and "power save mode" as used herein may refer, for example, to reducing, diminishing, shutting down, powering off, turning off and/or switching off the electrical current to a device and/or component, and/or to switching the device and/or component to operate at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

The terms "regular power" and "regular power mode" as used herein may refer, for example, to any operating mode enabling full reception and/or normal operation of a device and/or component, e.g., for full reception, handling, decoding, transmitting and/or processing of wireless communication signals.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE 802.11-1999: Wireless LAN Medium Access Control (MAC) and Physical Layer (PHY) Specifications*), 802.11a, 802.11b, 802.11g, 802.11h, 802.11j, 802.11n, 802.16, 802.16d, 802.16e, 802.16f, standards ("the IEEE 802 standards") and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like.

Reference is now made to FIG. 1, which schematically illustrates a block diagram of a system 100 in accordance with some demonstrative embodiments.

In some demonstrative embodiments, system 100 may include a wireless area network and/or a Basic Service Set (BSS) including one or more wireless communication devices, e.g., wireless communication devices 102, 144, 146, 148, 134, 136, and/or 138, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 144, 146, 148, 134, 136, and/or 138 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, wireless communication devices 102, 144, 146, 148, 134, 136, and/or 138 may include a wireless communication unit 108 to communicate with other wireless communication devices of system 100, e.g., as described below. Wireless communication devices 102, 144, 146, 148, 134, 136, and/or 138 may also include, for example, one or more of a processor 120, an input unit 112, an output unit 114, a memory unit 118, and a storage unit 116. Wireless communication devices 102, 144, 146, 148, 134, 136, and/or 138 may optionally include other suitable hardware components and/or software components.

In some demonstrative embodiments, some or all of the components of wireless communication devices 102, 144, 146, 148, 134, 136, and/or 138 may be enclosed in a common housing or packaging, and may be interconnected or operably associated using one or more wired or wireless links. In other embodiments, components of wireless communication devices 102, 144, 146, 148, 134, 136, and/or 138 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of wireless communication device 102, and/or of one or more suitable applications.

Input unit 112 includes, for example, a keyboard, a keypad, a mouse, a touch-pad, a track-ball, a stylus, a microphone, or other suitable pointing device or input device.

Output unit 114 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a ROM drive, a DVD drive, or other suitable removable or non-removable storage units. Memory unit 118 and/or storage unit 116, for example, may store data processed by wireless communication device 102.

In some demonstrative embodiments, wireless communication unit 108 includes, for example, one or more wireless transmitters, receivers and/or transceivers able to send and/or receive wireless communication signals, RF signals, frames, blocks, transmission streams, packets, messages, data items, and/or data. For example, wireless communication unit 108 may include or may be implemented as part of a wireless Network Interface Card (NIC), and the like.

Wireless communication unit 108 may include, or may be associated with, one or more antennas or one or more sets of antennae 110. Antennae 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, at least one of the wireless communication devices of system 100, for example, wireless communication device 102, may perform the functionality of an Access Point (AP), Control Point (CP), Base Station (BS) or any coordinator or controller, e.g., as defined by the IEEE 802.11 and/or WGA specifications.

In some demonstrative embodiments, wireless communication unit 108 may be capable of simultaneously transmitting transmissions to two or more other devices of system 100 and/or simultaneously receiving transmissions from two or more other devices of system 100.

In some embodiments, wireless communication unit 108 may be capable of performing Spatial Division Multiple Access (SDMA) communication. For example, wireless communication unit 108 may transmit a downlink SDMA transmission by transmitting different signals substantially simultaneously via antennae 110, such that the combined transmitted signals result in different signals, which are intended to be received by two or more other wireless communication devices of system 100, being transmitted substantially in different directions on the same frequency.

In some demonstrative embodiments, wireless communication unit 108 may receive an uplink SDMA transmission including different signals from two or more other devices of system 100.

The term "substantially simultaneously", as used herein with reference to transmitting to two or more different wireless communication devices and/or receiving from two or more wireless communication devices, may refer to transmitting and/or receiving two or more transmissions, wherein at least a portion of each transmission and/or reception occurs at the same time, but does not imply that the different transmissions and/or receptions must start and/or end at the same time, although they may.

In some demonstrative embodiments, wireless communication unit 108 may communicate with at least one group of a plurality of wireless communication devices of system 100, for example, groups 130 and/or 140, e.g., as described in detail below.

In some demonstrative embodiments, group 140 may include a first plurality of wireless communication devices of system 100, e.g., wireless communication devices 144, 146 and/or 148, which may be suitable for simultaneous downlink and/or uplink wireless communication with wireless communication unit 108; and/or group 130 may include a second plurality of wireless communication devices of system 100, e.g., wireless communication devices 134, 136 and/or 138, which may be suitable for simultaneous downlink and/or uplink wireless communication with wireless communication unit 108. For example, groups 130 and/or 140 may include SDMA groups of devices suitable for unidirectional, e.g., in an uplink direction to device 102 and/or a downlink direction from device 102, and/or bidirectional SDMA communication with wireless communication unit 108, e.g., as described below.

In some demonstrative embodiments, the wireless communication devices of groups 130 and/or 140 may be grouped together, e.g., by wireless communication unit 108, according to any suitable criteria, for example, one or more traffic-specification (TSPEC) requirements, e.g., quality of service requirements, bandwidth requirements, traffic pattern requirements, and the like, and/or any other suitable requirement and/or parameter.

In some demonstrative embodiments, wireless communication unit 108 may be capable of receiving the TSPEC information corresponding to wireless communication devices 144, 146, 148, 134, 136, and/or 138 as a part of an Add Traffic Stream (ADDTS) Request frame. The ADDTS frame received from a wireless communication device may include a suitable TSPEC Information Element (IE) and/or field, which may include the TSPEC information corresponding to the wireless communication device. In other embodiments, wireless communication unit 108 may receive the TSPEC information as part of any other suitable frame and/or communication and/or in any other suitable format.

In some demonstrative embodiments, the TSPEC information corresponding to a wireless communication device, as received by wireless communication unit 108, may include traffic flow information defining a traffic flow between the wireless communication device and wireless communication unit 108. The TSPEC information corresponding to the wireless communication device may include, for example, one or more of a traffic pattern of the traffic flow, a Quality of Service (QoS) of the traffic flow, and/or any other series of requirements, parameters, characteristics and/or expectations of a traffic flow. For example, wireless communication unit 108 may receive a first ADDTS frame from wireless communication device 144, including traffic flow information, e.g., a traffic pattern and/or a QoS, defining a traffic flow between wireless communication device 144 and wireless communication unit 108; a second ADDTS frame from wireless communication device 146, including traffic flow information, e.g., a traffic pattern and/or a QoS, defining a traffic flow between wireless communication device 146 and wireless communication unit 108; a third ADDTS frame from wireless communication device 148, including traffic flow information, e.g., a traffic pattern and/or a QoS, defining a traffic flow between wireless communication device 148 and wireless communication unit 108; a fourth ADDTS frame from wireless communication device 134, including traffic flow information, e.g., a traffic pattern and/or a QoS, defining a traffic flow between wireless communication device 134 and wireless communication unit 108; a fifth ADDTS frame from wireless communication device 136, including traffic flow information, e.g., a traffic pattern and/or a QoS, defining a traffic flow between wireless communication device 136 and wireless communication unit 108; and/or a sixth ADDTS frame from wireless communication device 138, including traffic flow information, e.g., a traffic pattern and/or a QoS, defining a traffic flow between wireless communication device 138 and wireless communication unit 108.

In some demonstrative embodiments, the TSPEC information, received by wireless communication unit 108 from a wireless communication device, may include a directionality of the traffic flow between the wireless communication device and wireless communication unit 108. The directionality of the traffic flow may be determined, for example, based on the traffic pattern of the traffic flow. For example, the directionality of the traffic flow may include an uplink traffic flow, e.g., including uplink transmissions from the wireless communication device to wireless communication unit 108; a downlink traffic flow, e.g., including downlink transmissions from wireless communication unit 108 to the wireless communication device; or a bidirectional traffic flow, e.g., including both uplink transmissions and downlink transmissions.

In some demonstrative embodiments, the QoS of the traffic flow may include, for example, a QoS parameter representing, for example, a priority type of the traffic flow, e.g., guaranteeing a certain level of performance. The priority type of the traffic flow may be selected, for example, from a set of predefined priority types. In one example, the QoS of the traffic flow may be selected from a set of four predefined priority types, for example, a video priority type, an audio (voice) priority type, a best effort priority type, and a background priority type, e.g., as defined by the 802.11 standard and/or any other suitable standard.

In some demonstrative embodiments, the traffic flow corresponding to a wireless communication device may be categorized as an isochronous traffic flow, for example, if the traffic flow includes a time-dependent traffic flow, e.g., including video and/or voice data; and/or as an asynchronous traffic flow, for example, if the traffic flow is not time-dependent, e.g., if the traffic flow does not include video or voice data.

In some demonstrative embodiments, wireless communication unit 108 may assign wireless communication devices 144, 146 and/or 148 to one or more groups, e.g., including group 140, based on the categorization and/or directionality of the traffic flows corresponding to wireless communication devices 144, 146 and/or 148; and/or assign wireless communication devices 134, 136 and/or 138 to one or more groups, e.g., including group 130, based on the categorization and/or directionality of the traffic flows corresponding to wireless communication devices 134, 136 and/or 138.

In some demonstrative embodiments, wireless communication unit 108 may assign wireless communication devices 134, 136, 138, 144, 146 and/or 148 to an uplink isochronous group, a downlink isochronous group, a bidirectional isochronous group, and/or a bi-directional asynchronous group. In other embodiments, wireless communication unit 108 may assign wireless communication devices 134, 136, 138, 144, 146 and/or 148 to any other suitable group.

In some demonstrative embodiments, wireless communication unit 108 may assign a wireless communication device of devices 134, 136, 138, 144, 146 and/or 148 to the uplink isochronous group, for example, if the TSPEC information corresponding to the wireless communication device represents an uplink traffic pattern including at least one of video and voice data; wireless communication unit 108 may assign the wireless communication device to the downlink isochronous group if the TSPEC information corresponding to the wireless communication device represents a downlink traffic pattern including at least one of video and voice data; wireless communication unit 108 may assign the wireless communication device to the bi-directional isochronous group if the TSPEC information corresponding to the wireless communication device represents a bidirectional traffic pattern including at least one of video and voice data; and/or wireless communication unit 108 may assign the wireless communication device to the bi-directional asynchronous group if the TSPEC information corresponding to the wireless communication device represents another traffic pattern.

Although some embodiments are described herein with reference to assigning a wireless communication device to a group based on the TSPEC information corresponding to the wireless communication device, other embodiments may include one or more wireless communication devices assigned to a group based on any other suitable criteria.

In some demonstrative embodiments, wireless communication unit 108 may assign wireless communication devices 144, 146 and 148 to group 140 and provide to wireless communication devices 144, 146 and 148 suitable group allocation information defining group 140 and/or relating to group 140; and/or assign wireless communication devices 134, 136 and 138 to group 130 and provide to wireless communication devices 134, 136 and/or 138 suitable group allocation information defining group 130 and/or relating to group 130.

In some demonstrative embodiments, wireless communication unit 108 may assign to groups 140 and/or 130 respective wireless communication addresses (also referred to as "group address" or "multicast address"). The group address assigned to each of groups 140 and/or 130 may include, for example, a suitable Media-Access-Control (MAC) address or a multicast address, which may be assigned uniquely, e.g., within system 100 and/or a Basic-Service-Set (BSS) controlled and/or managed by wireless communication unit 108.

In some demonstrative embodiments, wireless communication unit 108 may inform wireless communication devices 144, 146 and/or 148 of the group address assigned to group 140, and/or may inform wireless communication devices 134, 136 and/or 138 of the group address assigned to group 130, for example, by using any suitable transmission, frame and/or packet. For example, wireless communication unit 108 may transmit one or more unicast frames to wireless communication devices 144, 146, 148, 134, 136 and/or 138 e.g., a first group allocation frame addressed to wireless communication device 144, a second group allocation frame addressed to wireless communication device 146, a third group allocation frame addressed to wireless communication device 148, a fourth group allocation frame addressed to wireless communication device 134, a fifth group allocation frame addressed to wireless communication device 136 and/or a sixth group allocation frame addressed to wireless communication device 138. The first, second and third group allocation frames may include, for example, the group address of group 140 and the forth, fifth and sixth third group allocation frames may include, for example, the group address of group 130.

In some demonstrative embodiments, wireless communication unit 108 may determine, e.g., based on any suitable criteria, an order at which wireless communication devices 144, 146, 148, 134, 136 and/or 138 are to respond to a transmission from wireless communication unit 108, for example, such that wireless communication devices 144, 146, 148, 134, 136 and/or 138 may respond during non-overlapping time periods, e.g., as described below. For example, after assigning wireless communication devices 144, 146, 148 to group 140, wireless communication unit 108 may determine that wireless communication device 144 is to respond to the transmission from wireless communication unit 108 a first offset time after the transmission from wireless communication unit 108, that wireless communication device 146 is to respond to the transmission from wireless communication unit 108 a second offset time, which is longer than the first offset time after the transmission, and/or that wireless communication device 148 is to respond to the transmission from wireless communication unit 108 a third offset time, which is longer than the second offset time after the transmission. A difference between the second and first offset times and/or difference between the third and second offset times may be at least equal to a duration of the responses from wireless communication devices 144 and/or 146, e.g., to allow wireless communication devices 144, 146 and 148 to respond during non-overlapping periods.

In some demonstrative embodiments, wireless communication unit 112 may include an indication of the required order, for example, in the group allocation frame, e.g., as part of a predefined field ("the Device Association Identifier (AID) list field"). For example, the group allocation frame transmitted to devices 144, 146 and/or 148 may include values representing wireless communication devices 144, 146 and 148 according to the required order. For example, the group allocation frame may include, e.g., in AID list field, a value representing the MAC address of wireless communication device 146 followed by a value representing the MAC address of wireless communication device 144, which in turn may be followed by a value representing the MAC address of wireless communication device 148, e.g., if wireless communication device 146 is to respond to wireless communication unit 108 prior to a response from wireless communication device 144, which in turn is to respond to wireless communication unit 108 prior to a response from wireless communication device 148.

In some demonstrative embodiments, wireless communication devices 144, 146 and/or 148 may each determine the order at which to respond to wireless communication unit 108, based on the indication of the required order.

In some embodiments, wireless communication devices 144, 146 and/or 148 may transmit the responses at a data rate equal to a data rate of the transmission from wireless communication unit 108, e.g., in order to allow wireless communication devices 144, 146 and/or 148 to schedule the transmission of the responses, such that wireless communication device 108 may be able to receive the responses.

In another embodiment, wireless communication devices 144, 146 and/or 148 may transmit the responses at a selected predefined data rate for communication with wireless communication unit 108. In one example, wireless communication devices 144, 146 and/or 148 may transmit the responses at a data rate, which is selected from a predefined set of data rates implemented for communication in system 100, e.g., the BSSBasicRateSet as defined by the 802.11 standards. For example, wireless communication devices 144, 146 and/or 148 may transmit the responses at a highest data rate of the BSSBasicRateSet, which is less than or equal to a rate of an immediately previous frame received from wireless communication unit 108.

In some demonstrative embodiments, wireless communication unit 108 may assign wireless communication devices 144, 146 and/or 148 to group 140, and/or assign wireless communication devices 134, 136 and/or 138 to group 130, for example, while not directly providing wireless communication devices 144, 146 and/or 148 with information defining and/or relating to group 140 and/or not directly providing wireless communication devices 134, 136 and/or 138 with information defining and/or relating to group 130. According to this example, wireless communication unit 108 may simultaneously transmit downlink transmissions to devices of group 140 and/or 130, e.g., while one or more of the wireless communication devices of group 140 and/or 130 may not be aware of the simultaneous transmission to other devices in group 140 and/or 130, respectively, for example, if the one or more wireless communication devices are not required to and/or is not able to transmit uplink SDMA transmissions to wireless communication unit 108. For example, wireless communication unit 108 may transmit a downlink SDMA transmission to a wireless communication device, e.g., device 148, while the wireless communication device may not be aware to the fact that the downlink transmission is a downlink transmission, for example, if wireless communication device 148 is not required to and/or is not able to transmit uplink SDMA transmissions to wireless communication unit 108.

In some demonstrative embodiments, wireless communication unit 108 may schedule simultaneous uplink and/or downlink transmissions between wireless communication unit 108 and the wireless communication devices of a group ("the scheduled group") of groups 130 and/or 140, for example, according to any suitable power management scheme, e.g., a Power Save Multi-Poll (PSMP) scheme, and the like.

In some demonstrative embodiments, wireless communication unit 108 may transmit at least one scheduling frame, defining one or more uplink and downlink time periods, to the wireless communication devices of the scheduled group, e.g., as described below.

In some demonstrative embodiments, the scheduling frame may include any suitable power-management control frame, e.g., a PSMP activation frame, and the like. The scheduling frame may schedule at least one downlink transmission period, e.g., a PSMP downlink transmission (PSMP-DTT) period, during which wireless communication unit 108 may transmit simultaneous transmissions to wireless communication devices of the scheduled group; and/or at least one uplink transmission period, e.g., a PSMP uplink transmission (PSMP-UTT) period, during which wireless communication unit 108 is to receive uplink communications, e.g., sequentially and/or simultaneously, from wireless communication devices of the scheduled group, e.g., as described below.

In some demonstrative embodiments, wireless communication unit 108 may use the scheduling frame as part of the power management scheme, for example, to manage the scheduling of power save periods at one or more wireless communication devices of the scheduled group, e.g., between the downlink and/or uplink transmissions. For example, wireless communication unit 108 may transmit to the wireless communication devices of group 140 a scheduling frame instructing the wireless communication devices of group 140 to operate, during the one or more scheduled downlink periods, at a power mode, e.g., a regular power mode, at which the devices of group 140 are capable of receiving communications from wireless communication unit; and/or informing the wireless communication devices of group 140 of the one or more uplink periods, during which the wireless communication devices of group 140 may be allowed to transmit uplink transmissions to wireless communication unit 108. In one example, wireless communication unit 108 may transmit to the wireless communication devices of group 140 a scheduling frame defining a downlink period beginning within 5 milliseconds (ms), e.g., with reference to any suitable reference time point, and lasting 10 ms; and/or an uplink beginning within 60 ms and lasting 20 ms. According to this example, wireless communication devices 144, 146 and/or 148 may switch to a power save mode during a time period between $15^{th}$ ms and the $60^{th}$ ms. One or more wireless communication devices of the scheduled group may switch back to the regular power mode, e.g., before or at the end of the power save period.

In some demonstrative embodiments, wireless communication unit 108 may transmit one ore more scheduling frames to schedule uplink and/or downlink periods corresponding to two or more groups, e.g., groups 130 and 140. In one embodiment, wireless communication unit 108 may transmit a common scheduling frame to schedule different uplink and/or downlink periods for groups 130 and 140. For example, the scheduling frame may include an indication of group 130, e.g., the group address assigned to group 130, which may be associated with an indication of first uplink and/or downlink periods scheduled fro group 130; an indication of group 140, e.g., the group address assigned to group 140, which may be associated with an indication of first uplink and/or downlink periods scheduled fro group 140. In another embodiment, wireless communication unit 108 may transmit different scheduling frames to the wireless communication devices of different groups of wireless communication devices, to notify the wireless communication devices of the different groups of different scheduled simultaneous downlink and/or uplink periods. For example, wireless communication unit 108 may transmit a first scheduling frame to wireless communication devices 144, 146 and 148 of group 140, defining the downlink and/or uplink periods for group 140; and/or a second scheduling frame to wireless communication devices 134, 136 and 138 of group 130, defining the downlink and/or uplink periods transmission for group 130.

Figure 2:
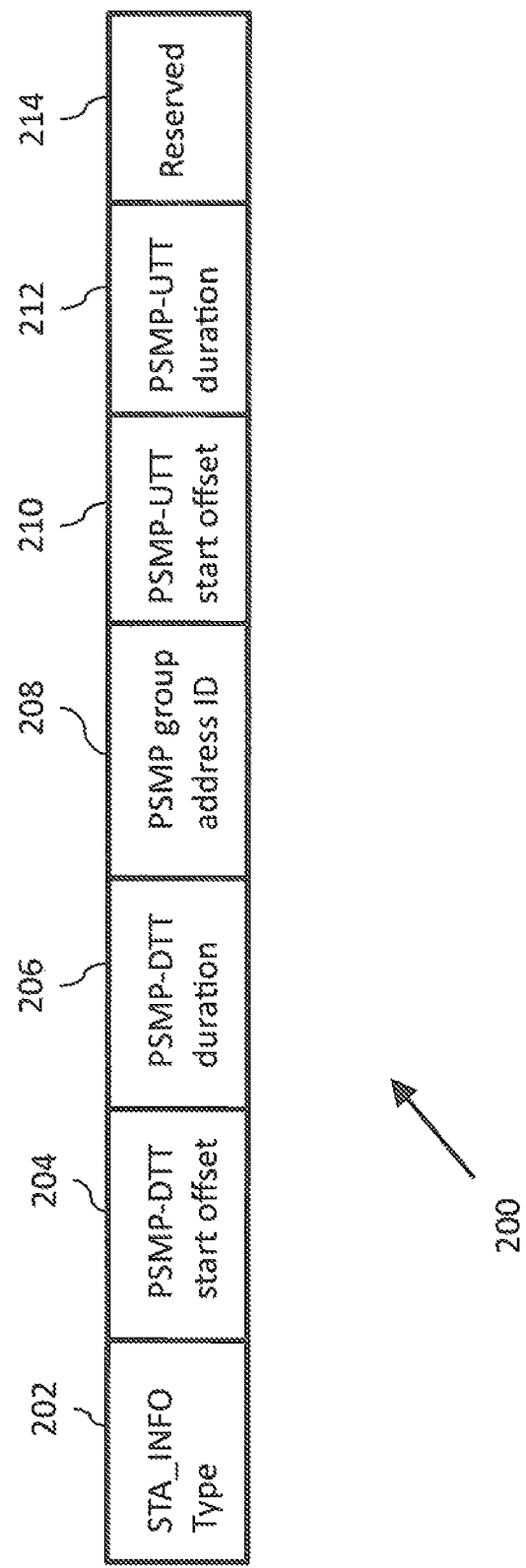
FIG. 2 is a schematic illustration of components of a scheduling frame, in accordance with some demonstrative embodiments.

Reference is now made to FIG. 2, which schematically illustrates components of a PSMP frame 200, in accordance with some demonstrative embodiments. In some embodiments, one or more components of frame 200 may be included as part of the scheduling frame transmitted by wireless communication unit 108 (FIG. 1), e.g., as part of a PSMP scheme.

In some demonstrative embodiments, the components shown in FIG. 2 may be transmitted as part of any suitable frame, packet and/or transmission, e.g., as a data portion of a PSMP frame.

In some demonstrative embodiments, PSMP frame 200 may include a suitable STA_INFO type field 202.

In some demonstrative embodiments, PSMP frame 200 may include a PSMP downlink transmission (PSMP-DTT) start offset field 204 to indicate the time of initiation of a PSMP-DTT period, e.g., with reference to any suitable reference time. For example, wireless communication unit 108 (FIG. 1) may transmit PSMP frame 200 to wireless communication devices 144, 146 and 148 of group 140 (FIG. 1), including PSMP-DTT start offset field 204 having a value indicating that the simultaneous PSMP DTT period scheduled for wireless communication devices 144, 146 and 148 (FIG. 1) will commence in 10 ms.

In some demonstrative embodiments, PSMP frame 200 may include a PSMP-DTT duration field 206 to indicate the duration of the PSMP DTT period. For example, a value of 6 in PSMP-DTT duration field 206 may indicate that the PSMP DTT scheduled for wireless communication devices 144, 146 and 148 of group 140 (FIG. 1), will last for 6 ms.

In some demonstrative embodiments, PSMP frame 200 may include at least one PSMP uplink transmission (PSMP-UTT) start offset field 210, to indicate the time of initiation of at least one PSMP UTT period, respectively. For example, wireless communication unit 108 (FIG. 1) may transmit PSMP frame 200 to wireless communication devices 144, 146 and 148 of group 140 (FIG. 1), including PSMP-UTT start offset field 210 indicating that the PSMP UTT period for transmissions from wireless communication devices 144, 146 and 148 (FIG. 1) will commence in 10 ms, e.g., if wireless communication devices 144, 146 and 148 (FIG. 1) support uplink SDMA transmissions. Alternatively, wireless communication unit 108 (FIG. 1) may transmit to each of wireless communication devices 144, 146 and 148 (FIG. 1) PSMP frame 200 including a different PSMP-UTT start offset value, for example, such that each of wireless communication devices 144, 146 and 148 (FIG. 1) may perform the PSMP UTT during non-overlapping time periods, e.g., if wireless communication devices 144, 146 and 148 (FIG. 1) do not support uplink SDMA transmissions.

In some demonstrative embodiments, PSMP frame 200 may include at least one PSMP-UTT duration field 212, to indicate the duration time of the at least one PSMP UTT period, respectively. For example, a value of 6 in PSMP-UTT duration field 212 may indicate that the PSMP UTT period is scheduled to last for 6 ms.

In some demonstrative embodiments, PSMP frame 200 may include an address ID field 208 (also referred to as "receiver address field"), to identify one or more wireless communication devices intended to receive PSMP frame 200.

In one embodiment, field 208 may represent the group address or multicast address assigned to the scheduled group, e.g., as described above, for example, if wireless communication unit 108 (FIG. 1) transmits frame 200 to the group of wireless communication devices as part of a broadcast transmission. In one example, field 208 may have a size of 43 bits and wireless communication unit 108 (FIG. 1) may include in field 208 43 bits, e.g., the 43 least-significant-bits (LSBs), of the group MAC address assigned to the scheduled group.

In another embodiment, PSMP group address ID 208 may represent a unicast address of a specific wireless communication device, e.g., wireless communication devices 144 intended to receive PSMP frame 200, e.g., if wireless communication unit 108 (FIG. 1) transmits frame 200 to a single wireless communication device as part of a unicast transmission. For example, wireless communication unit 108 (FIG. 1) may transmit three unicast transmissions including frame 200 addressed to wireless communication devices 144, 146 and 148 (FIG. 1), respectively.

In another embodiment, PSMP frame 200 may include a ID field 208 including a plurality of group addresses corresponding to a plurality of groups, e.g., two group address corresponding to groups 130 and 140, respectively. According to this embodiment, PSMP frame 200 may include a first set of PSMP-DTT and/or PSMP-UTT values defining one or more PSMP DTT and/or UTT periods scheduled for a first group of the plurality of groups; followed by a second set of PSMP-DTT and/or PSMP-UTT values defining one or more PSMP DTT and/or UTT periods scheduled for a second group of the plurality of groups, and so on.

In some demonstrative embodiments, PSMP frame 200 may include a reserved field 214 to include any suitable additional information.

In some demonstrative embodiments, fields 210 and 212 may define a common PSMP UTT period, during which the wireless communication devices of the scheduled group may simultaneously perform uplink transmissions, for example, if the wireless communication devices of the scheduled group support uplink SDMA transmission. For example, wireless communication unit 108 (FIG. 1) may transmit PSMP scheduling frame 200 to wireless communication devices 144, 146 and/or 148 (FIG. 1), including fields 210 and 212 defining at least one PSMP-UTT period scheduled for transmissions from wireless communication devices 144, 146 and/or 148 (FIG. 1) to wireless communication unit 108 (FIG. 1), e.g., if wireless communication devices 144, 146 and/or 148 (FIG. 1) support uplink SDMA transmission.

In some demonstrative embodiments, fields 210 and 212 may define a plurality of PSMP UTT periods, during which the wireless communication devices of the scheduled group may sequentially perform uplink transmissions, for example, if the wireless communication devices of the scheduled group do not support uplink SDMA transmission. For example, wireless communication unit 108 (FIG. 1) may define the order at which a plurality of PSMP UTT periods are to be scheduled to wireless communication devices 134, 136 and/or 138 of group 130 (FIG. 1), e.g., if wireless communication devices 134, 136 and/or 138 of group 130 (FIG. 1) do not support uplink SDMA transmissions. Wireless communication unit 108 (FIG. 1) may define the order using, for example, the AID list filed, e.g., as described above. Wireless communication unit 108 (FIG. 1) may transmit PSMP scheduling frame 200 to wireless communication devices 134, 136 and/or 138 (FIG. 1), including field 210 and 212 defining the beginning and duration of a first PSMP UTT period scheduled for transmission by a first device of group 130 (FIG. 1), e.g., determined according to the AID list; a second PSMP UTT period scheduled for transmission by a second device of group 130 (FIG. 1), e.g., according to the AID list, may begin after the first PSMP period and may last for the duration indicated by field 210, and so on.

In some demonstrative embodiments, wireless communication unit 108 (FIG. 1) may transmit some or all of the components of PSMP frame 200 to wireless communication devices of the scheduled group. For example, wireless communication unit 108 (FIG. 1) may transmit to a wireless communication device the PSMP frame 200 including PSMP-DTT start offset field 204, PSMP-DTT duration field 206 and PSMP group address ID 208, while not including fields 210 and/or 212, for example, if the wireless communication device is not scheduled to perform uplink transmission to wireless communication unit 108 (FIG. 1).

Figure 3:
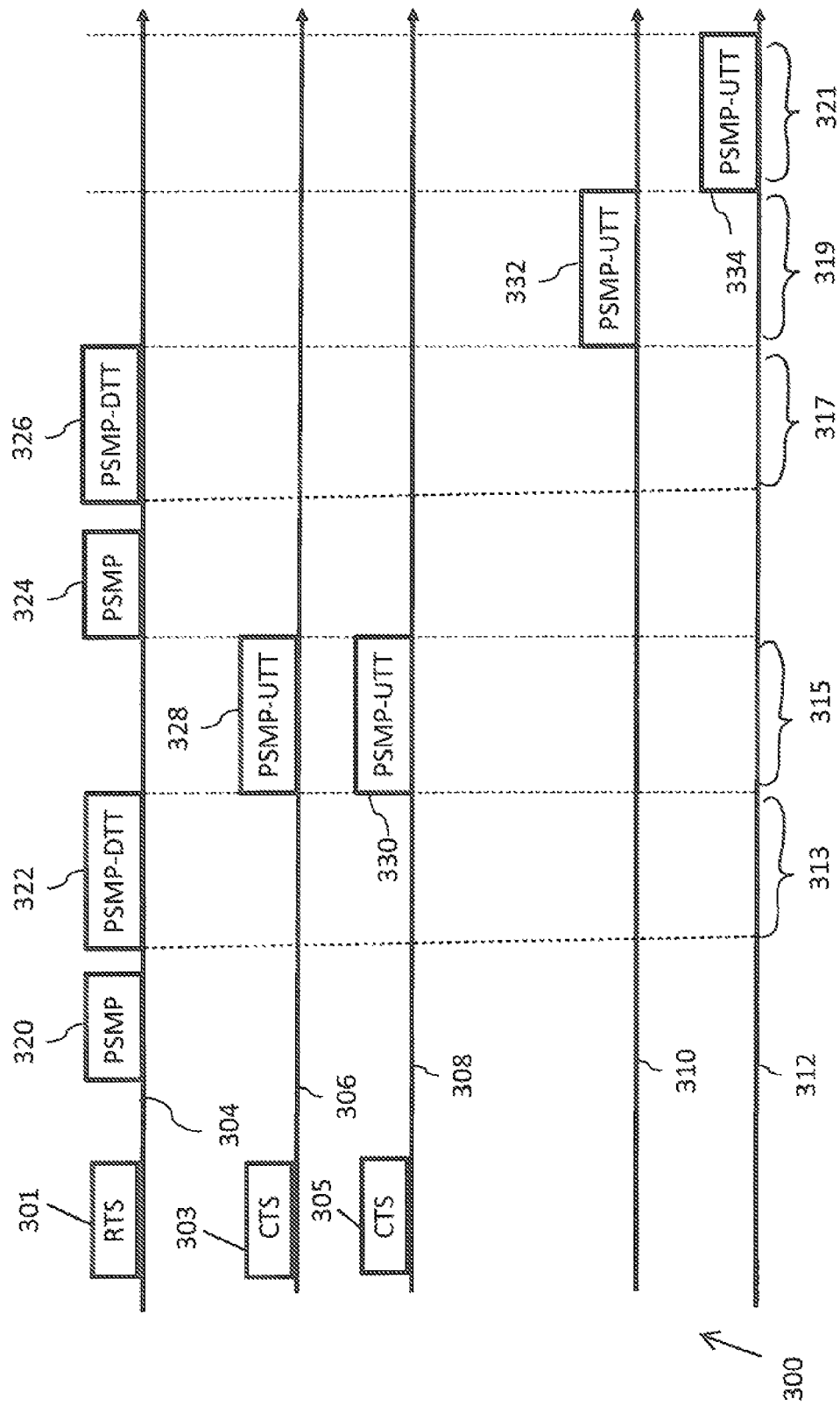
FIG. 3 is a schematic illustration of a sequence of communications between a wireless communication device and at least one group of other wireless communication devices, in accordance with some demonstrative embodiments.

Reference is now made to FIG. 3, which schematically illustrates a sequence 300 of transmissions between a wireless communication device, e.g., wireless communication device 102 (FIG. 1) and/or wireless communication unit 108 (FIG. 1), and one or more groups of other wireless communication devices, e.g., groups 140 and/or 130 (FIG. 1), in accordance with some demonstrative embodiments.

As shown in FIG. 3, a timeline 304 includes transmissions by the wireless communication device, e.g., wireless communication unit 108 (FIG. 1); a timeline 306 includes transmissions by a first wireless communication device of a first group, e.g., wireless communication device 144 (FIG. 1) of group 140 (FIG. 1); a timeline 308 includes transmissions by a second wireless communication device of the first group, e.g., wireless communication device 146 (FIG. 1) of group 140 (FIG. 1); a timeline 310 includes transmissions by a first wireless communication device of a second group, e.g., wireless communication device 134 (FIG. 1) of group 130 (FIG. 1); and a timeline 312 includes transmissions by a second wireless communication device of the second group, e.g., wireless communication device 136 (FIG. 1) of group 130 (FIG. 1).

In some demonstrative embodiments, wireless communication unit 108 (FIG. 1) may transmit a first PSMP scheduling frame 320 to the two or more wireless communication devices of the first group to schedule at least one simultaneous downlink transmission period 322 and/or at least one uplink transmission period 315 for the wireless communication devices of the first group. According to some embodiments, PSMP frame 320 may include some or all of the components of PSMP frame 200 (FIG. 2).

In some demonstrative embodiments, wireless communication unit 108 (FIG. 1) may simultaneously transmit downlink transmissions 322 to two or more wireless communication devices of the first group during period 313. For example, downlink transmissions 322 may be transmitted in the form of a downlink SDMA transmission. For example, wireless communication unit 108 (FIG. 1) may simultaneously transmit two or more different downlink transmissions 322 to the two or more wireless communication devices of the first group, e.g., to two or more of wireless communication devices 144, 146 and 148 (FIG. 1).

In some demonstrative embodiments, the two or more wireless communication devices of the first group may simultaneously transmit, during period 315, uplink transmissions 328 and 330, respectively to wireless communication unit 108 (FIG. 1). For example, transmissions 328 and 330 may be transmitted in the form of an uplink SDMA transmission.

In some demonstrative embodiments, wireless communication unit 108 (FIG. 1) may schedule one or more sequential uplink transmission periods, during which two or more wireless communication devices of a group, e.g., the second group, may sequentially transmit uplink transmissions to wireless communication unit 108 (FIG. 1), for example, if the wireless communication devices of the second group to do not support uplink SDMA transmission.

In some demonstrative embodiments, wireless communication unit 108 (FIG. 1) may transmit a second PSMP scheduling frame 324 to the two or more wireless communication devices of the second group to schedule at least one simultaneous downlink transmission period 317 and/or uplink transmission periods 319 and/or 321 for the wireless communication devices of the second group. According to some embodiments, PSMP frame 324 may include some or all of the components of PSMP frame 200 (FIG. 2).

In some demonstrative embodiments, wireless communication unit 108 (FIG. 1) may simultaneously transmit downlink transmissions 326 to two or more wireless communication devices of the second group during period 317. For example, downlink transmissions 326 may be transmitted in the form of a downlink SDMA transmission. For example, wireless communication unit 108 (FIG. 1) may simultaneously transmit two or more different downlink transmissions 326 to the two or more wireless communication devices of the second group, e.g., to two or more of wireless communication devices 134, 136 and 138 (FIG. 1).

In some demonstrative embodiments, the two or more wireless communication devices of the second group, e.g., wireless communication devices 134 and/or 136 of group 130 (FIG. 1) may transmit uplink SDMA transmissions, 332 and 334, respectively, to wireless communication unit 108 (FIG. 1) during non-overlapping time periods 319 and 321, respectively.

In some demonstrative embodiments, wireless communication device 108 (FIG. 1) may reserve a wireless communication medium for a time period ("the reserved time period") including at least the transmission period of the scheduling frame and the scheduled uplink and/or downlink transmission periods, e.g., to ensure that other communications are not performed during the reserved time period.

In some demonstrative embodiments, wireless communication unit 108 (FIG. 1) may reserve the wireless communication medium by transmitting, e.g., prior to transmitting frame 320, at least one Request-To-Send (RTS) packet 301 to one or more wireless communication devices of the scheduled group, e.g., group 140 (FIG. 1). The RTS packet 301 may include a duration value corresponding to the time period to be reserved. For example, a duration field of the RTS packet may be set by wireless communication unit 108 (FIG. 1) to include a value representing a time period including the transmission period of frame 320, and periods 313 and 315. Wireless communication unit 108 (FIG. 1) may receive at least one Clear-to-Send (CTS) packet from at least one of the wireless communication devices of the scheduled group, e.g., in response to RTS packet 301. For example, wireless communication unit 108 (FIG. 1) may receive CTS packets 303 and/or 305 from wireless communication devices 134 and/or 136 (FIG. 1), respectively. As shown in FIG. 3, in one embodiment, wireless communication unit 108 (FIG. 1) may simultaneously receive CTS packets 303 and/or 305, e.g., as part of an uplink SDMA transmission. In other embodiments, wireless communication unit 108 (FIG. 1) may sequentially receive CTS packets 303 and/or 305, for example, at an order defined by the AIDs list, e.g., as described above.

Figure 4:
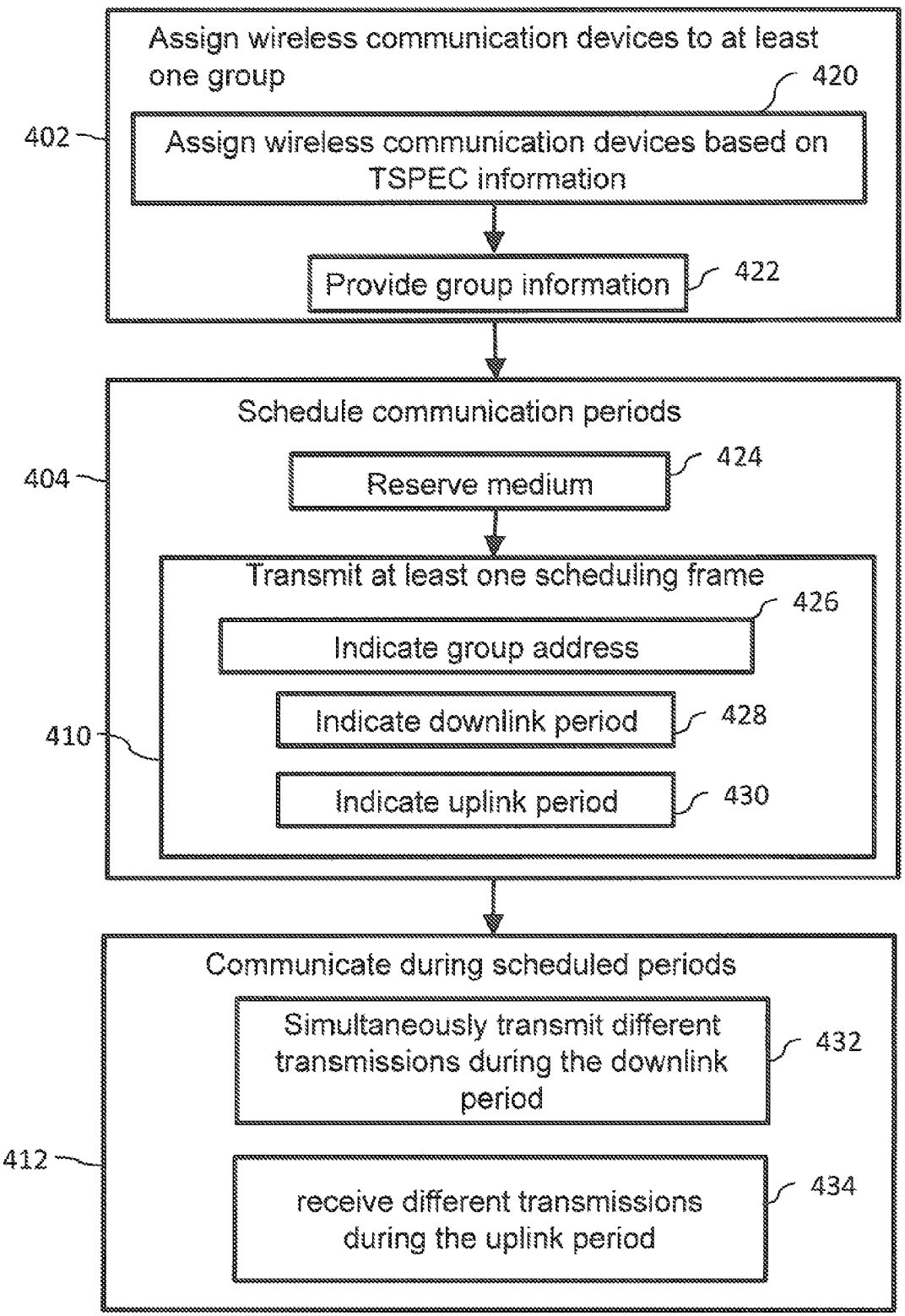
FIG. 4 is a schematic flow-chart illustration of a method of scheduling communications with a group of wireless communication devices, in accordance with some demonstrative embodiments.

Reference is made to FIG. 4, which schematically illustrates a method of scheduling communication with a group of wireless communication devices, in accordance with some demonstrative embodiments.

In some demonstrative embodiments, one or more of the operations of the method of FIG. 3 may be performed by a wireless communication device, for example, wireless communication device 102 (FIG. 1), a wireless communication unit, e.g., wireless communication unit 108 (FIG. 1) and/or any other wireless communication device capable coordinating transmissions within a network.

As indicated at block 402, the method may include assigning wireless communication devices to at least one group. For example, wireless communication unit 108 (FIG. 1) may assign wireless communication devices 144, 146 and/or 148 (FIG. 1) to group 140 (FIG. 1) and/or wireless communication devices 134, 136 and/or 138 (FIG. 1) to group 130 (FIG. 1), e.g., as described above.

As indicated at block 420, assigning the wireless communication devices to at least one group may include assigning the wireless communication devices based on TSPEC information corresponding to the wireless communication devices. For example, wireless communication devices 144, 146 and/or 148 (FIG. 1) to group 140 (FIG. 1) and/or wireless communication devices 134, 136 and/or 138 (FIG. 1) to group 130 (FIG. 1) based on TSPEC information corresponding to wireless communication devices 134, 136, 138, 144, 146 and/or 148 (FIG. 1), e.g., as described above.

As indicated at block 422, the method may include providing to the wireless communication devices, which are assigned to a group, information corresponding to the group. For example, wireless communication unit 108 (FIG. 1) may transmit one or more allocation frames to wireless communication devices 134, 136, 138, 144, 146 and/or 148 (FIG. 1), e.g., as described above.

As indicated at block 404, the method may include scheduling one or more communication periods for communication with the wireless communication devices of a scheduled group. For example, wireless communication unit 108 (FIG. 1) may schedule one or more PSMP-DTT and/or PSMP-UTT periods for group 130 (FIG. 1) and/or one or more PSMP-DTT and/or PSMP-UTT periods for group 140 (FIG. 1), e.g., as described above.

As indicated at block 424, scheduling the communication periods may include reserving a wireless communication medium for a duration corresponding to the communication periods. For example, wireless communication unit 108 (FIG. 1) may transmit RTS packet 301 (FIG. 3) to at least one wireless communication device of the scheduled group and/or receive CTS packets 303 and/or 305 (FIG. 3) from one or more wireless communication devices of the scheduled group, e.g., as described above.

As indicated at block 410, scheduling the communication periods may include transmitting at least one scheduling frame to the scheduled group. For example, wireless communication unit 108 (FIG. 1) may transmit PSMP scheduling frame 200 (FIG. 2) to one or more wireless communication devices of group 130 (FIG. 1) to schedule the communication periods for group 130 (FIG. 1), e.g., as described above.

As indicated at block 426, transmitting the scheduling frame may include transmitting an indication of the scheduled group. For example, wireless communication unit 108 (FIG. 1) may transmit PSMP frame 200 (FIG. 2) including the group address assigned to group 130 (FIG. 1), e.g., as described above.

As indicated at block 428, transmitting the scheduling frame may include transmitting an indication of at least one downlink period, e.g., a SDMA downlink transmission period. For example, wireless communication unit 108 (FIG. 1) may transmit frame 200 (FIG. 2) including PSMP-DTT start offset and/or PSMP-DTT duration fields including values defining at least one PSMP-DTT period, e.g., as described above.

As indicated at block 430, transmitting the scheduling frame may include transmitting an indication of at least one uplink period. For example, wireless communication unit 108 (FIG. 1) may transmit frame 200 (FIG. 2) including PSMP-UTT start offset and/or PSMP-UTT duration fields including values defining at least one PSMP-UTT period, e.g., as described above.

As indicated at block 412, the method may include communicating during one or more of the scheduled communication periods.

As indicated at block 432, communicating during one or more of the scheduled communication periods may include simultaneously transmitting two or more different wireless communication transmissions from the wireless communication unit to two or more respective wireless communication devices of the scheduled group during the downlink period. For example, wireless communication unit 108 (FIG. 1) may simultaneously transmit different downlink transmissions 320 (FIG. 3) to two or more wireless communication devices of the scheduled group, e.g., as described above.

As indicated at block 434, communicating during one or more of the scheduled communication periods may include receiving wireless communication transmissions during the uplink period. For example, wireless communication unit 108 (FIG. 1) may receive simultaneous uplink transmissions 328 and 330 (FIG. 3) and/or sequential uplink transmissions 332 and 334 (FIG. 3) from two or more wireless communication devices of the scheduled group, e.g., as described above.

Figure 5:
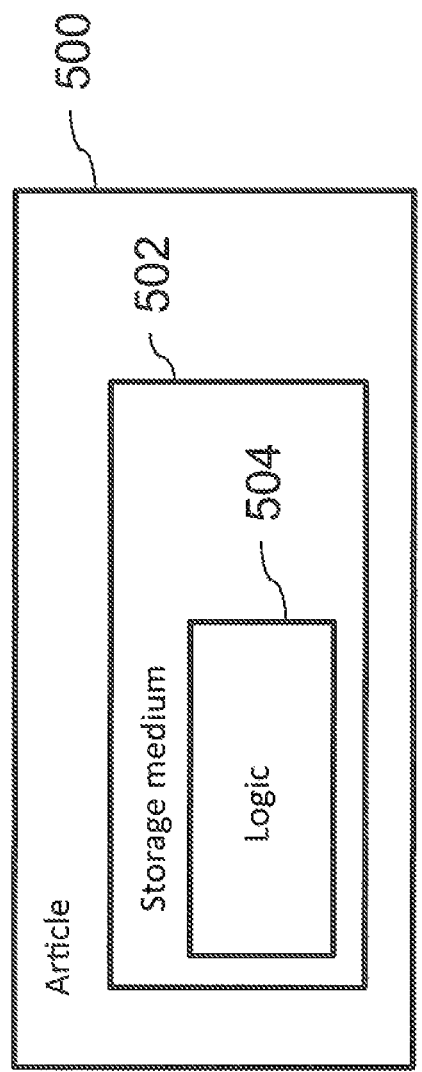
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a machine-readable storage medium 502 to store logic 504, which may be used, for example, to perform at least part of the functionality of wireless communication unit 108 (FIG. 1) and/or wireless communication device 102 (FIG. 1); and/or to perform one or more operations of the methods of FIG. 4.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device including a processor, a memory, one or more antennas, and a wireless communication unit, the wireless communication unit capable to:
    transmit a scheduling frame to wireless communication devices of a group of wireless communication devices, the scheduling frame including:
        a downlink transmission period field to indicate a downlink transmission period, during which the wireless communication unit is to simultaneously transmit to the group of wireless communication devices;
        a group address ID field to indicate an address assigned to the group of wireless communication devices;
    prior to transmitting the scheduling frame, reserve a wireless communication medium for a duration including at least a duration of a transmission of the scheduling frame and a duration of the downlink transmission period; and
    simultaneously transmit a plurality of different wireless transmissions to respective ones of wireless communication devices of the group during the downlink transmission period.

2. The device of claim 1, wherein the scheduling frame includes a downlink transmission start offset field to indicate a time of initiation of the downlink transmission period.

3. The device of claim 1, wherein the scheduling frame comprises a station information (STA_INFO) type field.

4. The device of claim 1, wherein the group address ID field is 43 bits.

5. The device of claim 1, further capable to:
    receive traffic-specification (TSPEC) information from a wireless communication device; and
    group the wireless communication device with other wireless communication devices based on the TSPEC information of the wireless communication device.

6. The device of claim 5, wherein the TSPEC information includes at least one element selected from the group consisting of a traffic pattern of traffic flow with the wireless communication unit, and a quality of service of the traffic flow.

7. The device of claim 5, wherein the group of wireless communication devices is one of a downlink isochronous group, a bi-directional isochronous group or a bi-directional asynchronous group, the wireless communication unit further being capable to assign wireless communication devices:
    to the downlink isochronous group if the TSPEC information corresponding to the wireless communication devices represents a downlink traffic pattern including at least one of video or voice data;
    to the bi-directional isochronous group if the TSPEC information corresponding to the wireless communication devices represents a bidirectional traffic pattern including at least one of video or voice data; and
    to the bi-directional asynchronous group if the TSPEC information corresponding to the wireless communication devices represents a traffic pattern different from the downlink traffic pattern including at least one of video or voice data, and the bidirectional traffic pattern including at least one of video or voice data.

8. The device of claim 1, wherein the scheduling frame further includes:
    an uplink transmission period field to indicate an uplink transmission period, during which the wireless communication unit is to receive an uplink transmission from one or more of the wireless communication devices of the group; and
    an uplink transmission start offset field to indicate a time of initiation of the uplink transmission period.

9. The device of claim 8, the wireless communication unit further being capable to send a respective one of a plurality of scheduling frames to respective ones of the wireless communication devices of the group, the plurality of scheduling frames having different uplink transmission start offset values to indicate a plurality of non-overlapping uplink transmission periods.

10. The device of claim 8, wherein the wireless communication unit is to simultaneously receive a plurality of different uplink transmissions from respective ones of the wireless communication devices of the group during the uplink transmission period.

11. The device of claim 1, wherein the wireless communication unit is to transmit the plurality of transmissions in the form of a space-division-multiple-access transmission.

12. A device including a processor, a memory, one or more antennas, and a wireless communication unit, the wireless communication unit capable to:
    transmit a scheduling frame to wireless communication devices of a group of wireless communication devices, the scheduling frame including:
        a downlink transmission period field to indicate a downlink transmission period;
        a group address ID field to indicate an address assigned to the group of wireless communication devices; and an uplink transmission period field to indicate an uplink transmission period, during which the wireless communication unit is to receive an uplink transmission from one or more of the wireless communication devices of the group;
prior to transmitting the scheduling frame, reserve a wireless communication medium for a duration including at least a duration of a transmission of the scheduling frame and a duration of the downlink transmission period; and
simultaneously receive a plurality of different uplink wireless transmissions from respective ones of wireless communication devices of the group during the uplink transmission period.

13. The device of claim 12, further capable to:
receive traffic-specification (TSPEC) information from a wireless communication device; and
group the wireless communication device with other wireless communication devices based on the TSPEC information of the wireless communication device.

14. A product including one or more tangible computer-readable non-transitory storage media comprising computer-executable instructions operable to, when executed by at least one computer processor, enable the at least one computer processor to implement a method, the method comprising:
transmitting a scheduling frame to wireless communication devices of a group of wireless communication devices, the scheduling frame including:
a downlink transmission period field to indicate a downlink transmission period to simultaneously transmit to the group of wireless communication devices; and
a group address ID field to indicate an address assigned to the group of wireless communication devices;
prior to transmitting the scheduling frame, reserving a wireless communication medium for a duration including at least a duration of a transmission of the scheduling frame and a duration of the downlink transmission period; and
simultaneously transmitting a plurality of different wireless transmissions to respective ones of wireless communication devices of the group during the downlink transmission period.

15. The product of claim 14, wherein the method comprises:
receiving traffic-specification (TSPEC) information from a wireless communication device; and
grouping the wireless communication device with other wireless communication devices based on the TSPEC information of the wireless communication device.

16. The product of claim 15, wherein the TSPEC information includes at least one element selected from the group consisting of a traffic pattern of traffic flow, and a quality of service of the traffic flow.

17. The product of claim 15, wherein the group of wireless communication devices is one of a downlink isochronous group, a bi-directional isochronous group or a bi-directional asynchronous group, the method comprising assigning wireless communication devices:
to the downlink isochronous group if the TSPEC information corresponding to the wireless communication devices represents a downlink traffic pattern including at least one of video or voice data;
to the bi-directional isochronous group if the TSPEC information corresponding to the wireless communication devices represents a bidirectional traffic pattern including at least one of video or voice data; and
to the bi-directional asynchronous group if the TSPEC information corresponding to the wireless communication devices represents a traffic pattern different from the downlink traffic pattern including at least one of video or voice data, and the bidirectional traffic pattern including at least one of video or voice data.

18. The product of claim 14, wherein the scheduling frame further includes:
an uplink transmission period field to indicate an uplink transmission period, during which an uplink transmission is to be received from one or more of the wireless communication devices of the group; and
an uplink transmission start offset field to indicate a time of initiation of the uplink transmission period.

19. The product of claim 18, wherein the method comprises sending a respective one of a plurality of scheduling frames to respective ones of the wireless communication devices of the group, the plurality of scheduling frames having different uplink transmission start offset values to indicate a plurality of non-overlapping uplink transmission periods.

20. The product of claim 18, wherein the method comprises simultaneously receiving a plurality of different uplink transmissions from respective ones of the wireless communication devices of the group during the uplink transmission period.

21. The product of claim 14, wherein the method comprises transmitting the plurality of transmissions in the form of a space-division-multiple-access transmission.

22. A method comprising:
transmitting a scheduling frame to wireless communication devices of a group of wireless communication devices, the scheduling frame including:
a downlink transmission period field to indicate a downlink transmission period;
a group address ID field to indicate an address assigned to the group of wireless communication devices; and
an uplink transmission period field to indicate an uplink transmission period, during which an uplink transmission is to be received from one or more of the wireless communication devices of the group;
prior to transmitting the scheduling frame, reserving a wireless communication medium for a duration including at least a duration of a transmission of the scheduling frame and a duration of the downlink transmission period; and
simultaneously receiving a plurality of different uplink wireless transmissions from respective ones of wireless communication devices of the group during the uplink transmission period.

23. The method of claim 22, wherein the group address ID field is 43 bits.

24. The method of claim 22 comprising:
receiving traffic-specification (TSPEC) information from a wireless communication device; and
grouping the wireless communication device with other wireless communication devices based on the TSPEC information of the wireless communication device.

* * * * *